United States Patent [19]

Pesce

[11] Patent Number: 4,907,328
[45] Date of Patent: Mar. 13, 1990

[54] METHOD OF MAKING PIECES OF FURNITURE FROM SHEETS OF FELT TREATED WITH HARDENING SUBSTANCES

[75] Inventor: Gaetano Pesce, Paris, France

[73] Assignee: Cassina S.p.A., Milan, Italy

[21] Appl. No.: 239,215

[22] Filed: Aug. 31, 1988

[30] Foreign Application Priority Data

Sep. 8, 1987 [IT] Italy .............................. 21841 A/87

[51] Int. Cl.⁴ .............................................. B68G 7/02
[52] U.S. Cl. ..................................... 29/91.1; 29/419.1;
264/136; 264/137; 264/115; 264/116; 264/156;
264/257; 297/180; 297/446
[58] Field of Search ...................... 29/91.1, 458, 527.2,
29/419.1; 297/180, 445, 446; 264/136, 137, 115,
116, 257, 156; 156/222

[56] References Cited

U.S. PATENT DOCUMENTS

| | | | |
|---|---|---|---|
| 4,210,182 | 7/1980 | Danko | 297/446 X |
| 4,335,725 | 6/1982 | Geldmacher | 297/180 X |
| 4,473,521 | 9/1984 | Tassone | 264/136 |
| 4,660,887 | 4/1987 | Fleming et al. | 297/445 |
| 4,718,153 | 1/1988 | Armitage et al. | 29/91.1 |
| 4,780,167 | 10/1988 | Hill | 264/137 X |

FOREIGN PATENT DOCUMENTS 2098058 11/1982 United Kingdom ................ 297/180

Primary Examiner—Timothy V. Eley
Assistant Examiner—Peter Dungba Vo
Attorney, Agent, or Firm—Herbert Dubno

[57] ABSTRACT

The invention relates to a method of making pieces of furniture, more particularly arm-chairs and the like, starting from flat sheets of felt or the like, and comprising the following phases:
preparation of a flat sheet formed by a felt or similar compressed material including or adapted to be associated with a hardening substance;
punching of the flat sheet in a pattern corresponding to the flat lay-out of the piece of furniture to be produced, arranging all the incisions and holes required for the successive foldings and applications of its parts;
possible softening of the hardening substance included in the felt or the impregnation of the felt with a hardening substance;
shaping of the flat sheet to the final form of the piece of furniture to be obtained;
hardening of the hardening substance in the zones which must be given the required rigidity, leaving the other zones in the natural state;
assembly of any further parts of the piece of furniture for its completion;
finishing treatments of the piece of furniture.

8 Claims, 3 Drawing Sheets

METHOD OF MAKING PIECES OF FURNITURE FROM SHEETS OF FELT TREATED WITH HARDENING SUBSTANCES

BACKGROUND OF THE INVENTION

The making of pieces of furniture, more particularly arm-chairs, sofas or the like, generally requires the use of various different materials, some of which form the structure or supporting frame, others the upholstery, while others form the cushions, arms and so forth. As a rule such materials are first shaped and then assembled to form the piece of furniture in such a way that they cannot be modified or arranged otherwise than in a defined manner.

OBJECT OF THE INVENTION

It is the object of the invention to make pieces of furniture formed by a single starting material which is substantially soft and flexible and can when suitably treated produce all the parts of the piece of furniture in accordance with the needs arising.

SUMMARY OF THE INVENTION

This technical problem is solved by the method according to the invention, which utilizes a single material composed of short threads or woven fabrics, or else nonwoven fabrics such as, for example, felts, heavy felts, padding and the like, or, alternatively, woven fabrics connected in a number of layers, compacted or the like, including fabrics which are pierced at intervals, preferably of appreciable thickness, for which the method according to the invention comprises the following processing phases:

- the preparation of a flat sheet formed by a felt or similar compressed material including or adapted to be associated with a hardening substance;
- the punching of the flat sheet in a pattern corresponding to the flat layout of the article of furniture to be produced, arranging all the incisions and holes required for the successive foldings and applications of its parts;
- the possible softening of the hardening substance included in the felt or the impregnation of the felt with a hardening substance;
- the shaping of the flat sheet to the final form of the piece of furniture to be obtained;
- the hardening of the hardening substance in the zones which must be given the required rigidity, leaving the other zones in the natural state;
- the assembly of any further parts of the piece of furniture for its completion; and
- the finishing treatments of the piece of furniture.

The hardening substance is included in the solid state in the form of granules, crystals, powder or the like during the preparation of the flat sheet of felt or the like, or it can be associated with the flat sheet of felt by impregnation solely in the zones to be subjected to subsequent hardening. The conformation of the flat sheet, already punched and associated with the hardening substance, is performed by placing the sheet on a mold, template or the like which reproduces the final shape of the piece of furniture and is heated in the zones in which the hardening substance is to be hardened. The assembly of the shaped and hardened sheet to complementary elements of the piece of furniture obtained by the same process or by other means is performed via strings, rivets, pins or the like on their own or in combination.

The punched flat sheet of felt and any complementary parts required can be assembled and disposed in the final conformation of the piece of furniture while still in the initial natural state and then be hardened by heating solely in the zones which must have the required hardness; in that case the heating can be performed by means of resistance-heating elements previously inserted into the felt.

The parts of the piece of furniture to hardening are formed by the supporting stem up to a level higher than that of the seat, while the remaining parts, forming the back and any side members and arms retain substantially the degree of flexibility of the initial felt, so that they can be shaped in any desired way by the user in accordance with his or her own requirements.

The flat sheet of felt has a thickness of between 10 mm and 60 mm, preferably between 20 and 40 mm.

BRIEF DESCRIPTION OF THE DRAWING

These and other features will be more clearly understood from the following description of an example of the application of the method in which the article obtained is an arm-chair comprising a rigid lower portion of the stem resting on the floor and a substantially flexible upper portion which forms the arms and the back and can therefore be deformed as the user desires, as illustrated in the accompanying drawing, wherein.

SPECIFIC DESCRIPTION

Figure 1:
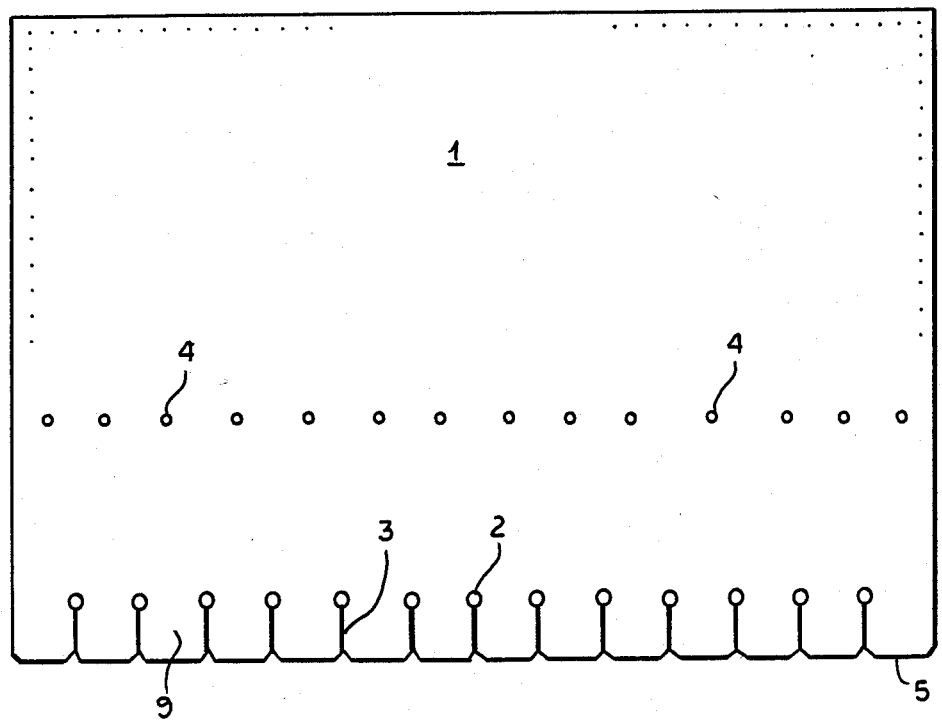
FIG. 1 is a plan view of the initial flat sheet.
Figure 2:
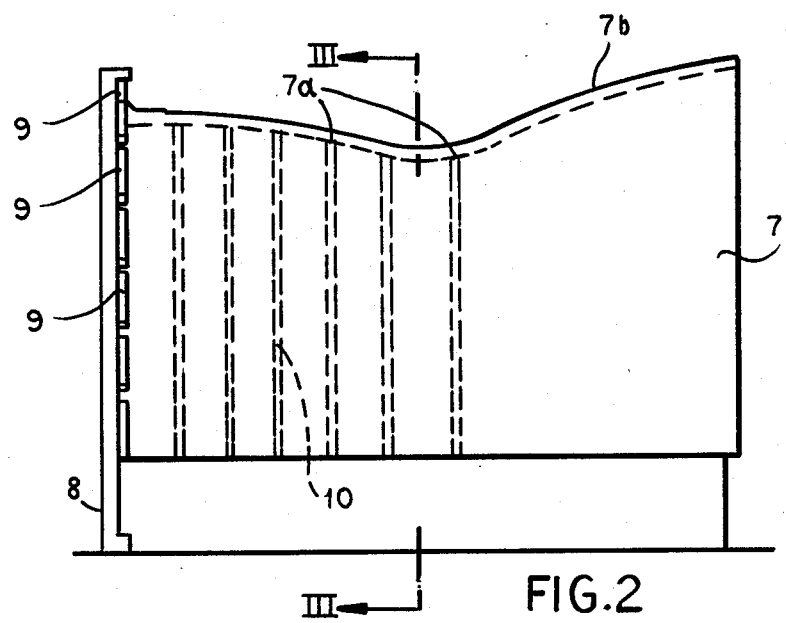
FIG. 2 is a side elevation of the template on which the flat sheet is formed.
Figure 3:
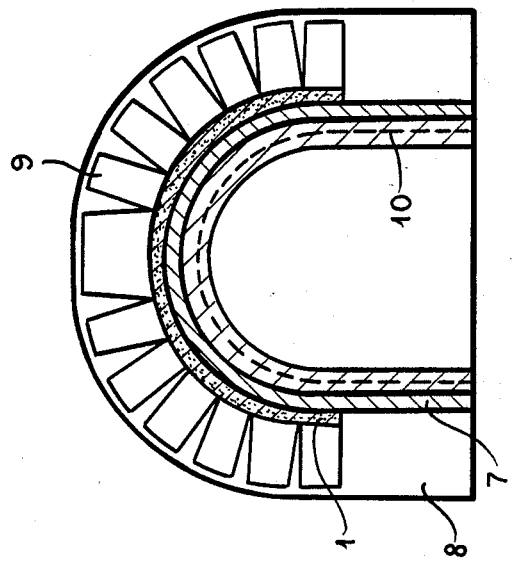
FIG. 3 is a section through this shape, taken along the line III—III of FIG. 2.

FIG. 1 shows a flat sheet 1 of impregnatable material of the heavy felt kind having a thickness of between 20 and 30 mm and dimensions corresponding to the lay-out plan of the surface of the armchair.

Figure 4:
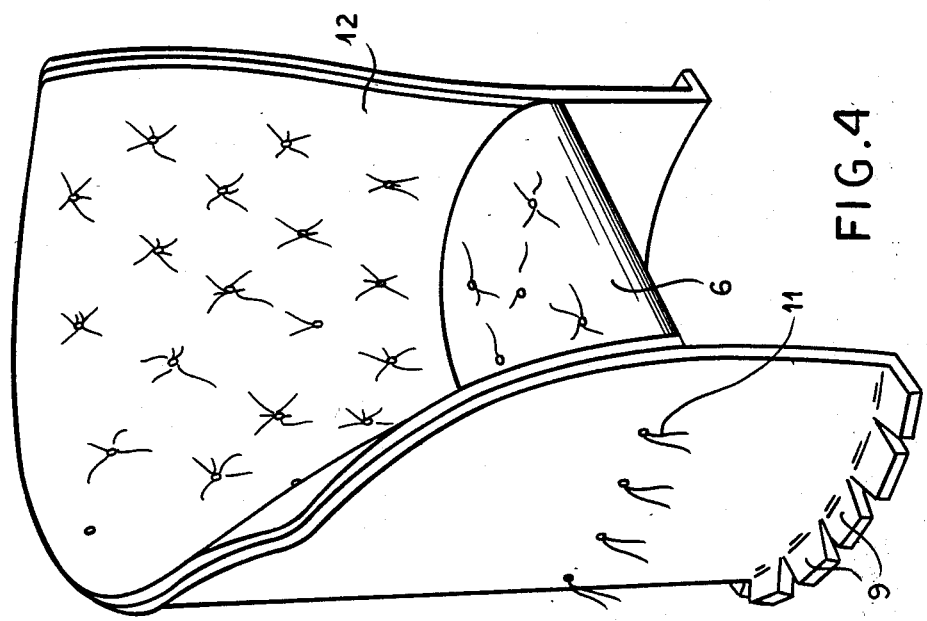
FIG. 4 is a perspective view of the finished arm-chair.

Along one edge 5 of the flat sheet, holes 2 and incisions 3 are punched which will permit the subsequent operation of folding outwards the resulting tongues 9, forming the feet via which the arm-chair rests on the floor, at the same time holes 4 are also produced at a predetermined distance from the edge 5 corresponding to the desired height from the ground of the seat 6 (FIG. 4). To simplify matters, the outer edges are shown to be rectilinear, although they can have any desired outline. The flat sheet thus prepared is impregnated with a hardening substance such as, for example, a polyester resin with catalyst; the impregnation must be performed from the base edge 5 to a level higher than that of the holes 4—i.e., higher than the height of the seat.

When the flat sheet has been impregnated, it is placed on a template 7 which reproduces the volume and final shape of the armchair (in the embodiment illustrated), having the necessary curves 7a and inclinations 7b which will determine the back and the side members. The template also has a lowered shoulder surface 8 in which are inserted the folded tongues 9 forming the feet via which the finished armchair is supported on the floor. The template 7 must be heated to harden the resin only in the preselected areas, and not in the areas which are to remain soft. To this end, in the embodiment illustrated, resistances 10 are disposed inside the template 7 which can be energized corresponding to the various zones to be heated, to boost the hardening of the resin and the consequent rigidification of the supporting part. A seat 6 is produced by a similar method, which will therefore not be further described.

When the two separate elements have been produced, they are connected to one another via any known means of the type of strings, pins or rivets, on their own or in combination; the embodiment disclosed uses strings 11 and internal pins (not shown) to ensure the required rigidity.

When the assembly of the armchair has been completed, the finishing operations are performed such as, for example, coloring and the application of padded quilting 12, to make the seat more comfortable and complete the ornamental finish.

Also according to the invention the flat sheet of felt 1 can be associated with a hardening substance at the same time as the flat sheet is produced, for example, in the form of granules, beads, dust or the like, which are included inside the thickness in the solid state and which can be treated by heating for the required diffusion and hardening in the appropriate zones. In contrast, the hardening substance will remain inert in those zones which must remain flexible. In this variant the impregnation is not performed, since the thermosetting substance is already associated with the sheet of felt during its production, while the final conformation and heating are performed on the template or the like described hereinbefore.

Figures 5, 6:
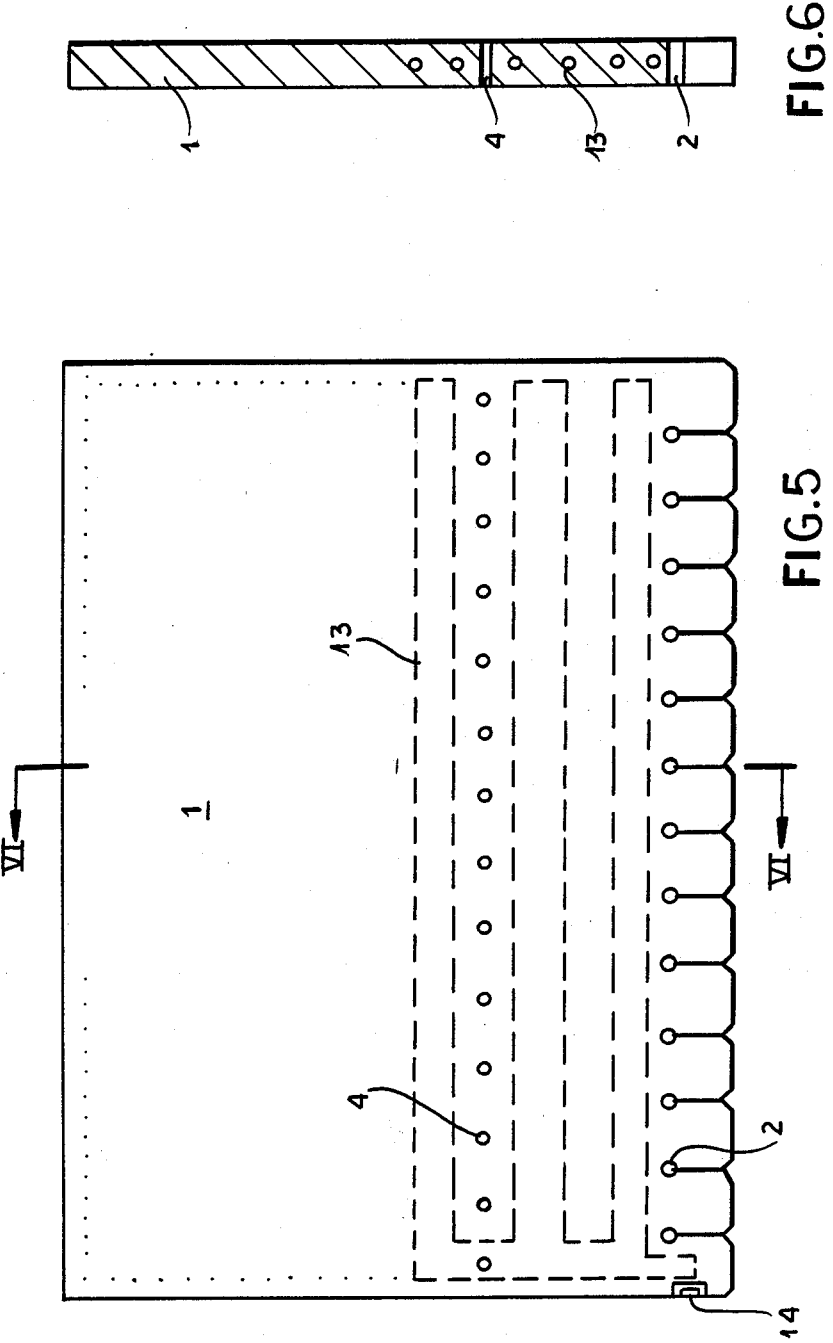
FIG. 5 is a plan view of the sheet, as a variant of FIG. 1 with incorporated resistances.
FIG. 6 is a cross-section taken along the line VI—VI of FIG. 5.

As variant and for particular purpose (FIGS. 5 and 6) as, for example, in the case of simple shapes which can be produced by the user himself or herself without the need of templates, the already punched flat sheet of felt 1 is provided with electric resistances 13 inserted in the zones to be hardened and connected to a socket 14 inserted at a suitable position in the sheet itself.

The sheet thus arranged can remain in the flat condition, occupying a limited space for storage and/or transport until it is used.

In that case the user can bring the flat sheet into the required final shape by applying to it all the complementary parts and then energizing the resistances provided for heating and hardening the supporting parts.

The other parts will remain flexible and deformable, as described hereinbefore.

Other variants can be introduced into the method without departing from the scope of the invention in its general features.

I claim:

1. A method of making an article of furniture having a predetermined three-dimensional shape, comprising the steps of:
   (a) cutting a piece of fabric out of a web of a generally soft and pliable fabric in a pattern corresponding to a developed shape of an article of furniture to be made and providing the cutout piece of fabric, prior to imparting to it said predetermined shape, with a thermally activatable hardening substance;
   (b) shaping the cutout piece of fabric to a three-dimensional shape corresponding to the predetermined shape of said article of furniture; and
   (c) thermally activating said substance only at selected parts of the piece of fabric in said three-dimensional shape to rigidify said parts and render said three-dimensional shape of said piece of fabric fully self-supporting, while leaving other parts of said three-dimensional shape of said piece of fabric unrigidified and soft and pliable.

2. The method defined in claim 1 wherein said three-dimensional shape is generally the shape of an armchair.

3. The method defined in claim 2 wherein, during cutting in step (a), a multiplicity of slits are cut into said piece and, in step (b) tongues defined in said piece between said slits are bent outwardly to form feet for said armchair, said parts including said feet.

4. The method defined in claim 3 wherein said piece is impregnated with a hardenable thermally activatable material after cutting in step (a) and before thermal activation in step (c).

5. The method defined in claim 3 wherein said web is manufactured with said substance therein and said substance is present in said web upon cutting in step (a).

6. The method defined in claim 3 wherein said web is a felt of a thickness between 10 and 60 mm.

7. The method defined in claim 6, further comprising the step of cutting out, shaping and thermally activating and rigidifying a seat from said felt and attaching said seat to the three-dimensional shape.

8. A method of making an article of furniture having a predetermined three-dimensional shape, comprising the steps of:
   (a) cutting a piece of fabric out of a web of a generally soft and pliable fabric in a pattern corresponding to a developed shape of an article of furniture to be made and providing the cutout piece of fabric, prior to imparting to it said predetermined shape, with a thermally activatable hardening substance;
   (b) shaping the cutout piece of fabric to a three-dimensional shape corresponding to the predetermined shape of said article of furniture;
   (c) thermally activating said substance only at selected parts of the piece of fabric in said three-dimensional shape to rigidify said parts and render said three-dimensional shape of said piece of fabric fully self-supporting, while leaving other parts of said three-dimensional shape of said piece of fabric unrigidified and soft and pliable; and
   incorporating at least in said parts resistive heating elements, step (c) comprising energizing said resistive heating elements.

* * * * *